United States Patent [19]
Naganuma

[11] Patent Number: 6,027,261
[45] Date of Patent: Feb. 22, 2000

[54] EXPOSURE ADJUSTING DEVICE FOR A CAMERA

[75] Inventor: Hiroaki Naganuma, Yamanashi-ken, Japan

[73] Assignee: Nisca Corporation, Yamanashi-ken, Japan

[21] Appl. No.: 09/052,211

[22] Filed: Mar. 31, 1998

[30] Foreign Application Priority Data

Mar. 31, 1997 [JP] Japan ................................... 9-096569
Mar. 31, 1997 [JP] Japan ................................... 9-096570
Mar. 31, 1997 [JP] Japan ................................... 9-096571

[51] Int. Cl.[7] .................................................. G03B 9/04
[52] U.S. Cl. .............................................................. 396/508
[58] Field of Search ..................................... 396/463, 508, 396/259, 257

[56] References Cited

U.S. PATENT DOCUMENTS 5,262,812  11/1993  Fukasawa ............................. 396/463

FOREIGN PATENT DOCUMENTS 5-34898   5/1993  Japan.
07-028124 1/1995  Japan.

*Primary Examiner*—W. B. Perkey
*Attorney, Agent, or Firm*—Kane, Dalsimer, Sullivan and Levy, LLP

[57] ABSTRACT

A high-performance exposure adjusting device for a camera has a magnet rotor united with an aperture member capable of steadily assuming three exposing positions according to the polarity of a direct current applied to a coil surrounding the rotor. When applying no current to the coil, the aperture member takes its magnetically neutral position to form a full aperture and is magnetically stabilized by a yoke surrounding the rotor. When the direct current of one polarity is applied to the coil, the aperture member rotates in one direction to form a first reduced aperture, and when the polarity of the current applied is reversed, a second reduced aperture is formed.

15 Claims, 8 Drawing Sheets

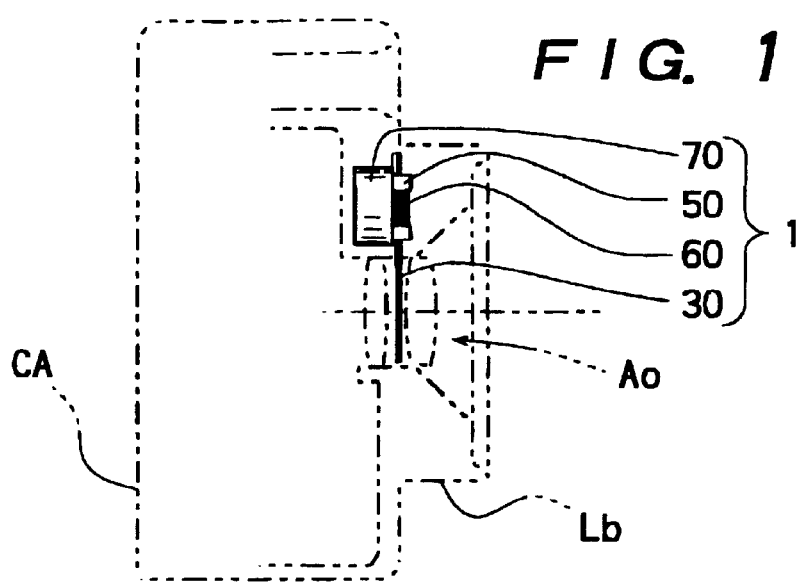
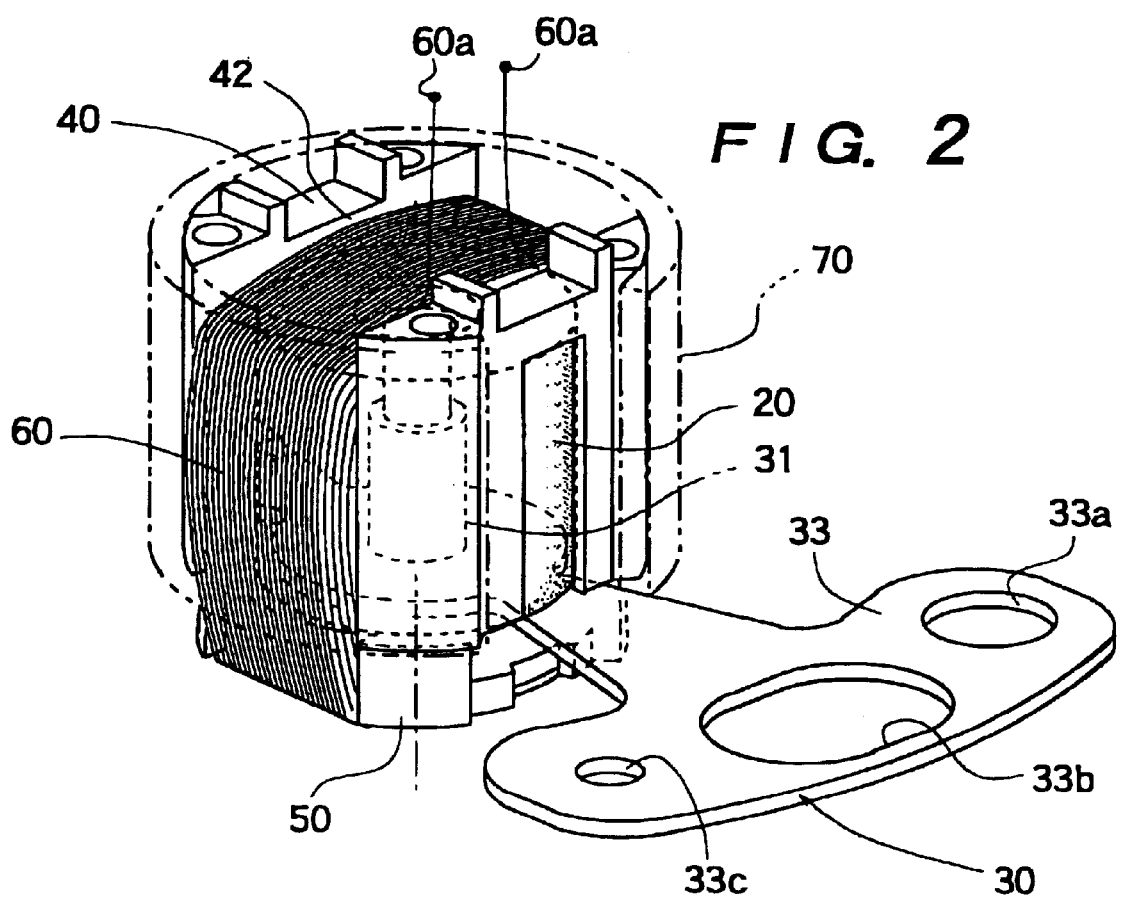

EXPOSURE ADJUSTING DEVICE FOR A CAMERA

BACKGROUND OF THE INVENTION

1. Field of the Invention

This invention relates to a device for adjusting exposure in a camera, and more particularly to a small-sized high-performance exposure adjusting device capable of stably activating an aperture member having three exposing apertures with high efficiency.

2. Description of the Prior Art

For exposure adjustment in a still camera or backlight compensation in a video camera, an exposure adjusting device for controlling or partially closing an exposing aperture to dim exposure is incorporated in the cameras. There has been known a conventional exposure adjusting device for continuously varying an exposing aperture by moving two iris diaphragms each having an exposing opening in opposite directions.

In general, a conventional simplified exposure adjusting device used for a simple camera employs one iris diaphragm or aperture plate having two exposing apertures different in size, which is moved rockingly like a pendulum so as to select either one of the exposing apertures. One of the exposing apertures is substantially equal in size to the lens aperture of the camera to form a full aperture, and the other exposing aperture is smaller than the lens aperture so as to reduce the intensity of light passing through the lens aperture.

The iris diaphragm in the simple exposure adjusting device is usually urged by elastically forcing mechanism including a spring or other mechanical elastic means so as to be kept fully open in a steady state, and activated against the elastically forcing mechanism by use of an electromagnetic actuator, solenoid or the like to enter into the optical path in the camera, thereby to partially block off the light passing therethrough.

The aforementioned prior art exposure adjusting device calls for a relatively large force for driving the iris diaphragm because the iris diaphragm is constantly urged by such mechanical elastic forcing means such as a spring. Furthermore, the conventional exposure adjusting device adopting the mechanical elastic forcing means may possibly malfunction due to the current consumption of a power source.

Under the present circumstances in which even a low-priced simple camera has a tendency to be enhanced in performance, a need has been felt for a high-accurate exposing device capable of adjusting the exposure stepwise, e.g. three exposing steps. However, a conventional exposure adjusting device capable of carrying out three-step exposure is complicated in structure and will come expensive, and therefore, it is not suitable for a simple camera moderate in price. Thus, there has been a great need for a simplified high-performance exposure adjusting device for a camera, which is simple in structure and stably operable with a high accuracy.

OBJECT OF THE INVENTION

An object of the present invention is to provide a small-sized high-performance exposure adjusting device simple in structure and suitable for a camera, which can stably perform three-step exposure with a high accuracy.

Another object of the invention is to provide a simple exposure adjusting device having an aperture member with a plurality of exposing apertures different in size, which can be activated effectively without using a mechanical elastic forcing means and readily controlled with a simple controlling system so as to be stably held selectively at any of the predetermined exposure positions.

Still another object of the invention is to provide an exposure adjusting device having a simple mechanism for efficiently and stably driving exposing aperture elements including a rotor united with an aperture member with a plurality of exposing apertures.

Yet another object of the invention is to provide a high-performance exposure adjusting device having an aperture member united with a rotor for forming an exposing aperture capable of varying continuously in size, which is simple in structure, easy to assemble and operable stably.

SUMMARY OF THE INVENTION

To attain the objects described above according to the present invention, there is provided an exposure adjusting device for a camera, which comprises a rotor formed of a permanent magnet, a coil for generating a magnetic field with application of a direct current for rotating the rotor, an aperture member having one or more exposing apertures, and a yoke surrounding the rotor for magnetically stabilizing the rotor.

The aperture member may be provided with three exposing apertures including the largest aperture equal to the full aperture of the camera, which are arranged at regular intervals on a circular arc about the rotational center thereof.

In a steady state in which no current is applied to the coil, the yoke surrounding the magnetic rotor is magnetized by the magnetic field of the rotor, so that the rotor is balanced by the action of the mutual magnetic attraction occurring between the rotor and yoke and steadily takes a magnetically neutral position defined on the optical path of the camera. When the rotor is held at the neutral position, the full aperture in the aperture member substantially coincides with the lens aperture of the camera, thus to fully open the lens aperture.

By applying a direct current to the coil, the rotor rotates in one direction according to the polarity of the direct current, so that the aperture member is rockingly moved to locate either of the first and second reduced apertures formed in the aperture member at the lens aperture of the camera. By reversing the polarity of the direct current applied to the coil, the rotor rotates in the reverse direction to locate the other reduced aperture in the aperture member at the lens aperture of the camera. Thus, the three exposing apertures can be arbitrarily formed by controlling the direct current applied to the coil.

The aperture member may be formed of a pair of aperture diaphragms which move slidably in parallel in opposite directions to vary the size of the exposing aperture.

The aperture member may be provided with a supporting bracket having operating fingers to be connected to the respective aperture diaphragms, so as to be united with the rotor without boring a supporting hole for securing the aperture member. Thus, decrease of magnetic force, which is caused due to formation of the supporting hole in the rotor, can be prevented.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF EXPLANATION OF THE DRAWINGS

FIG. 1 is an explanatory diagram schematically showing an exposure adjusting device of this invention applied to a camera.

FIG. 2 is a partial cutaway perspective view schematically showing a first embodiment of the device according to this invention.

DESCRIPTION OF THE PREFERRED EMBODIMENTS

This invention provides a high-performance device used as exposure adjusting means in a simple still camera, a backlight compensating device in a video camera, or the like. As illustrated in FIG. 1 by way of example, the exposure adjusting device 1 of the invention is assembled in a lens barrel Lb of a small camera CA, so as to open or partially close a lens aperture Ao of the camera.

Figure 3:
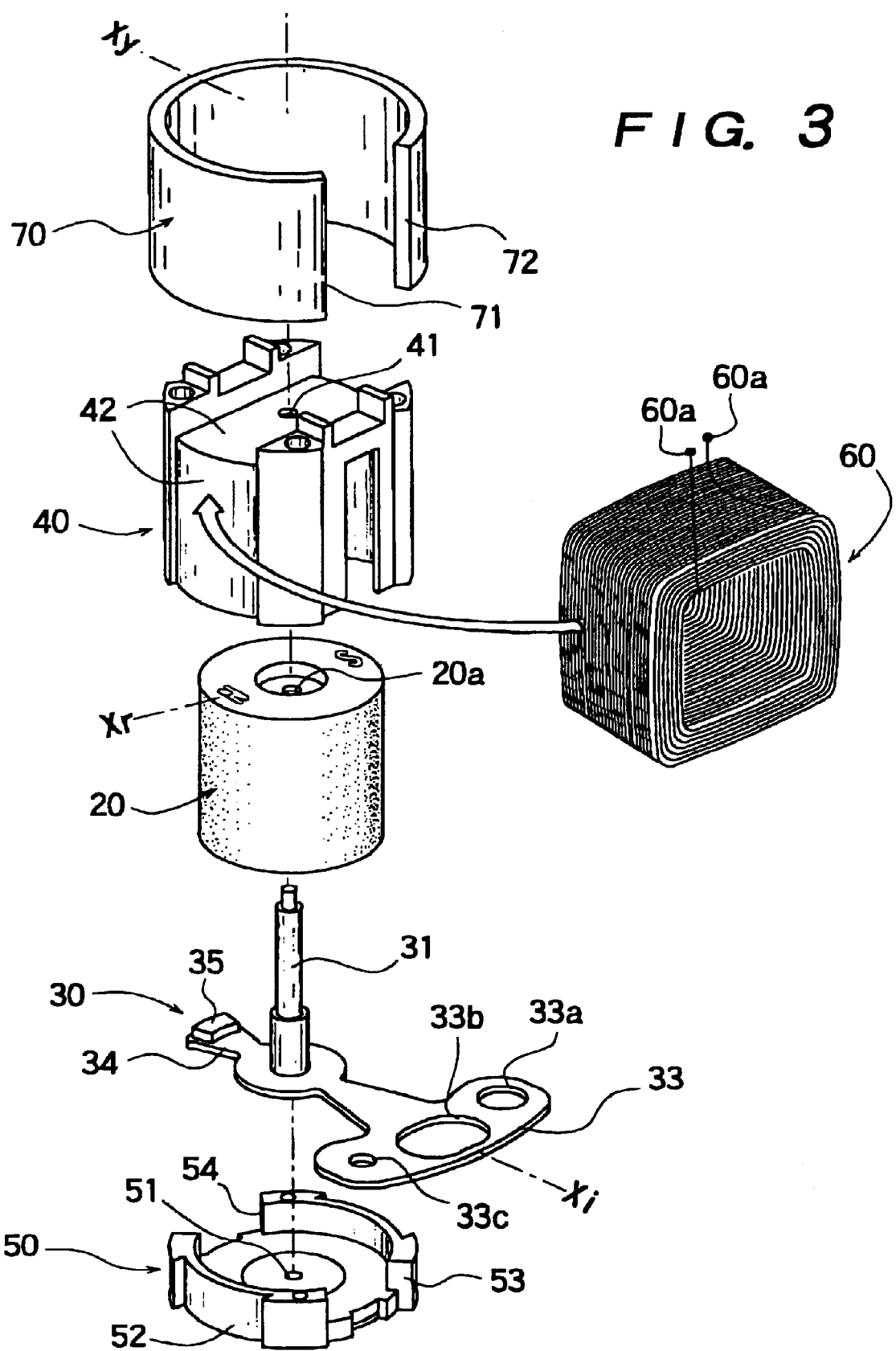
FIG. 3 is an exploded perspective view of FIG. 2.
Figure 5:
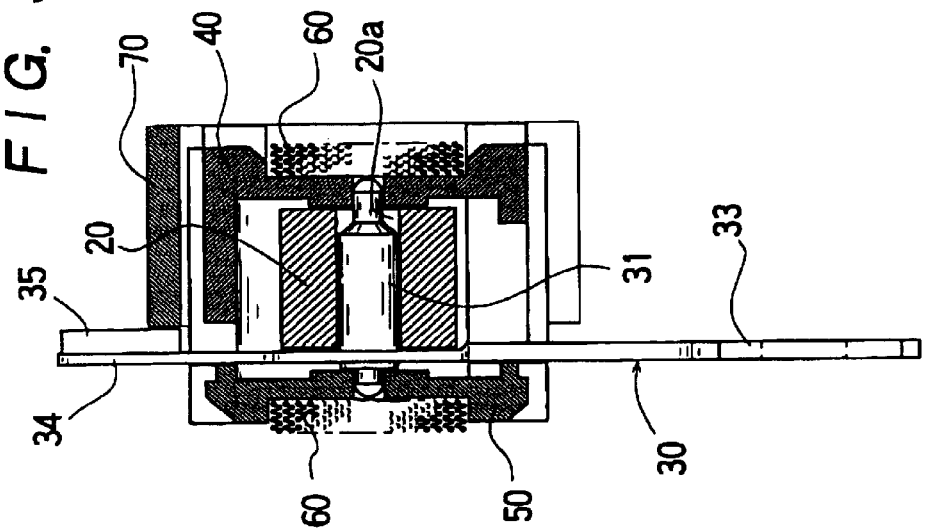
FIG. 5 is a sectioned side view of FIG. 4.

The exposure adjusting device 1 in one embodiment of the invention comprises, as shown in FIGS. 2 and 3, a rotor 20 formed of a permanent magnet and having an axial hole 20a, an aperture member 30 having a rotating shaft 31 fitted into the axial hole 20a of the rotor 20 and an aperture portion 33 with three apertures 33a–33c different in size, main and counterpart holders 40 and 50 united to form an accommodating space for the rotor 20, a coil 60 wound around the united holders 40 and 50, which induces a magnetic field with application of an electric current thereto, and a yoke 70 surrounding the united holders 40 and 50 with the coil 60.

The rotor 20 has a pair of magnetic poles N and S opposite to each other in the radial direction astride the center axial hole 20a.

The rotor 20 is formed in the shape of a substantially cylindrical column, but the shape of the rotor 20 is by no means limited thereto. The rotor 20 may have any other desired shape as an ellipsoidal or flat square pillar.

The apertures 33a–33c in the aperture member 30 are arranged at regular intervals on a circular arc about the rotational center thereof. In this embodiment, the center aperture 33b is largest and substantially equal to the lens aperture of the camera to which the exposure adjusting device of the invention is applied. That is, the largest aperture 33b becomes a full aperture.

The first reduced aperture 33a formed in one side part of the aperture portion 33 is smaller than the center aperture 33b, and the second reduced aperture 33c formed in the other side part of the aperture portion 33 is smaller than the first reduced aperture 33a. With the first and second reduced apertures 33a and 33c, the light exposure can be reduced stepwise.

In the illustrated embodiment, the largest aperture 33b is placed in the center, but the order in which the apertures 33a–33c are arranged should not be understood as being limited thereto.

The aperture member 30 has a balancing portion 34 which extends along the center line Xi in the opposite direction from the rotating shaft 31 relative to the aperture portion 33. The balancing portion 34 is provided with a balancing weight 35 for balancing the aperture portion 33 therewith, so that the aperture member 30 can stably move regardless of the posture in which the exposure adjusting device is mounted or used.

Figure 4:
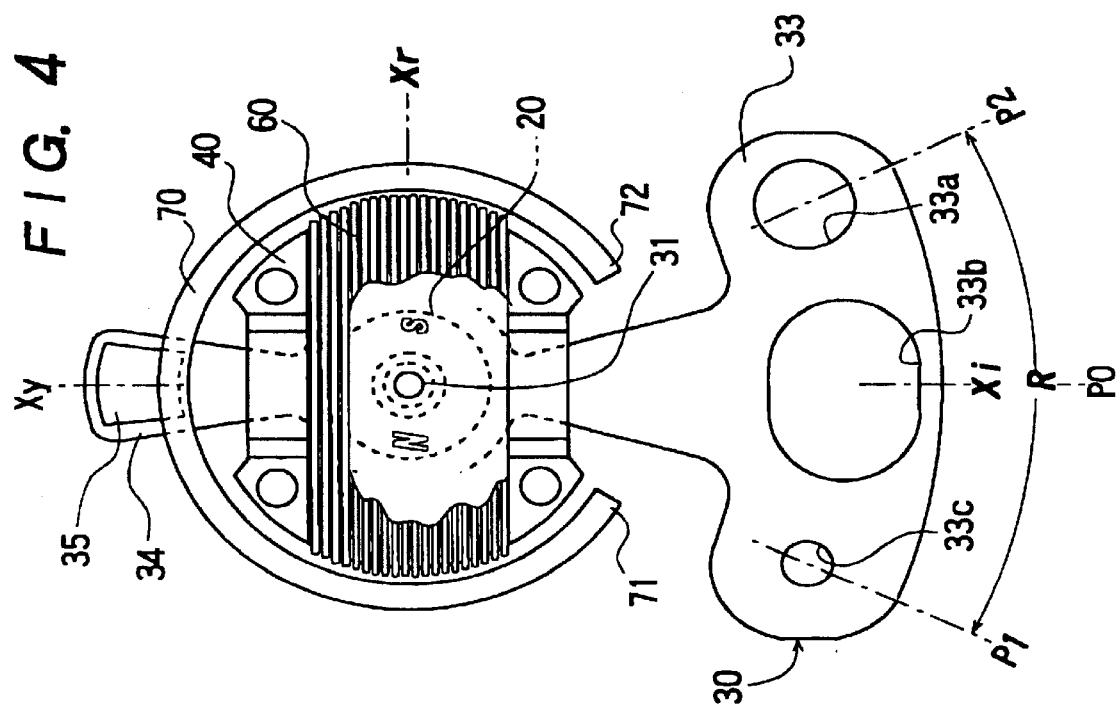
FIG. 4 is a partial cutaway plan view of FIG. 2.

As shown in FIG. 4, the magnetic poles N and S of the magnet rotor 20 united with the aperture member 30 are directed in the direction Xr perpendicular to the center line Xi passing through the centers of the aperture portion 33 and the balancing portion 34.

The main holder 40 is formed in the shape of a substantially cylinder so as to rotatably enclose the cylindrical rotor 20 and provided in its end face (upper surface in FIG. 3) with a bearing hole 41 for rotatably supporting one end of the rotating shaft 31 of the aperture member 30. The main holder 40 is further provided in its outer surface with a coil groove 42.

The counterpart holder 50 is fitted to the open end portion (lower end in FIG. 3) to close the inner space defined between the holders 40 and 50 for accommodating the rotor 20. The holder 50 is provided in its end face (lower surface in FIG. 3) with a bearing hole 51 for rotatably supporting the other end of the rotating shaft 31 of the aperture member 30. The holder 50 is further provided in its outer surface with a coil groove 52.

The counterpart holder 50 in this embodiment has notches 53 and 54 formed radially opposite to each other in the circumferential wall, so that the aperture portion 33 and the balancing portion 34 of the aperture member 30 protrude outside through the notches 53 and 54. The notches 53 and 54 serves to restrict the rocking movement of the aperture member 30 within the limit R between a first aperture position P1 and a second aperture position P2, as shown in FIG. 2.

Figure 6:
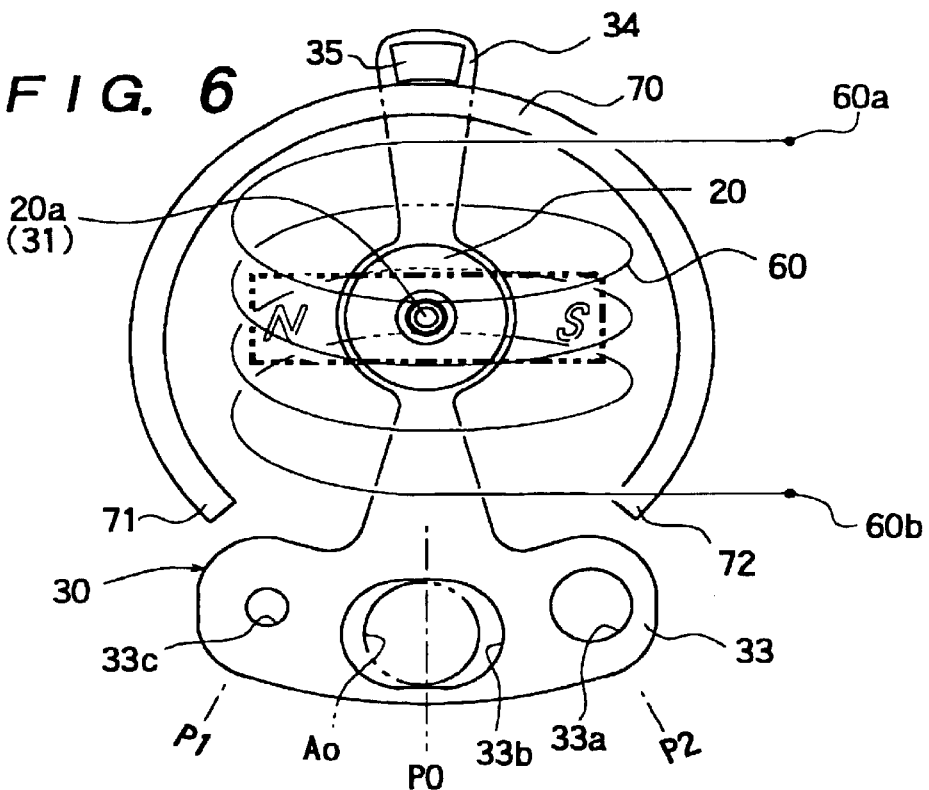
FIG. 6 is a schematic view explanatory of the operating principle of the device of the invention, showing its steady state.

The coil 60 is wound around the united holders 40 and 50 within which the rotor 20 is accommodated as shown in FIG. 2. Therefore, in reality, the coil as shown in FIG. 3 is nonexistent independently in the state of dismantling the device as illustrated. Reference numerals 60a and 60b denote electrodes for applying an electric current to the coil 60 to magnetically excite. The coil 60 is wound in the magnetic direction Xr defined by the magnetic poles N and S of the magnet rotor 20 held in its magnetically neutral equilibrium state as shown in FIG. 4 or FIG. 6.

The yoke 70 is formed by curving a plate of magnetic material such as soft iron into a substantially C shape having a longitudinal slot defined between terminal ends 71 and 72 opposed to each other.

The yoke 70 is magnetized by the magnet rotor 20 surrounded thereby. By the mutual action of the magnetic force of the rotor 20 and the magnetism of the yoke 70 induced by the magnet rotor 20, the rotor 20 steadily assumes its magnetically equilibrium state in the yoke 70. That is, the rotor 20 takes the neutral position P0 at which the magnetic direction Xr defined by the magnetic poles N and S of the rotor 20 is perpendicular to the center line Xy of the yoke 70 at the center between the terminal ends 71 and 72 of the yoke 70.

Figure 7:
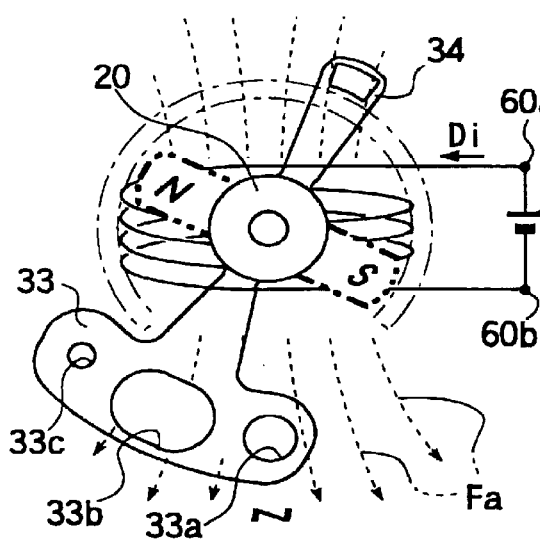
FIG. 7 is a schematic view explanatory of the operating principle of the device of the invention, showing the state of forming a first reduced aperture.
Figure 8:
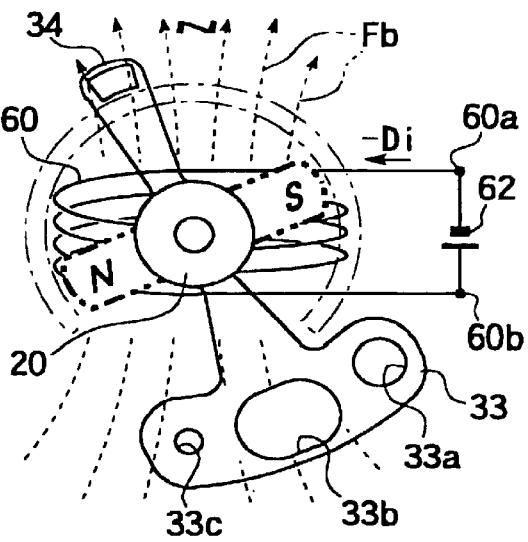
FIG. 8 is a schematic view explanatory of the operating principle of the device of the invention, showing the state of forming a second reduced aperture.

With application of a direct current to the coil 60, a magnetic field is induced as indicated by Fa in FIG. 7 and Fb in FIG. 8, consequently to rotate the rotor 20 in the direction determined by the polarity of the direct current applied to the coil 60.

To be more specific, when no current is applied to the coil 60, the rotor 20 steadily assumes its magnetically equilibrium state (neutral full-aperture position P0) shown in FIG. 6, as noted above.

In the steady state of the rotor 20 as illustrated, the center largest aperture 33*b* in the aperture member 30 substantially coincides with the lens aperture Ao of the camera, thus to form the full aperture.

When applying a positive direct current Di to the coil 60 as shown in FIG. 7, the aperture portion 33 rockingly moves to cause the first reduced aperture 33*a* to coincide with the lens aperture Ao. Consequently, the aperture member 30 stably assumes its first reduced aperture state.

When applying a negative direct current −Di to the coil 60 as shown in FIG. 8, the aperture portion 33 rockingly moves in the reverse direction to cause the second reduced aperture 33*c* to coincide with the lens aperture Ao. Consequently, the aperture member 30 stably assumes its second reduced aperture state.

Thus, according to the exposure adjusting device of the invention, three exposure apertures can be securely formed by controlling the application of the direct current to the coil 60.

It is a matter of course that the magnetomotive performance of the magnetizing system including the magnet rotor 20 and the coil 60 in the exposure adjusting device of the invention depends on the magnetomotive force of the coil 60 and the magnetic force of the rotor 20. Although the rotor 20 has the center axial hole 20*a* for receiving the rotating shaft 31 of the aperture member 30, the magnetomotive force of the rotor 20 can be increased by omitting such an axial hole from the rotor.

Figure 9:
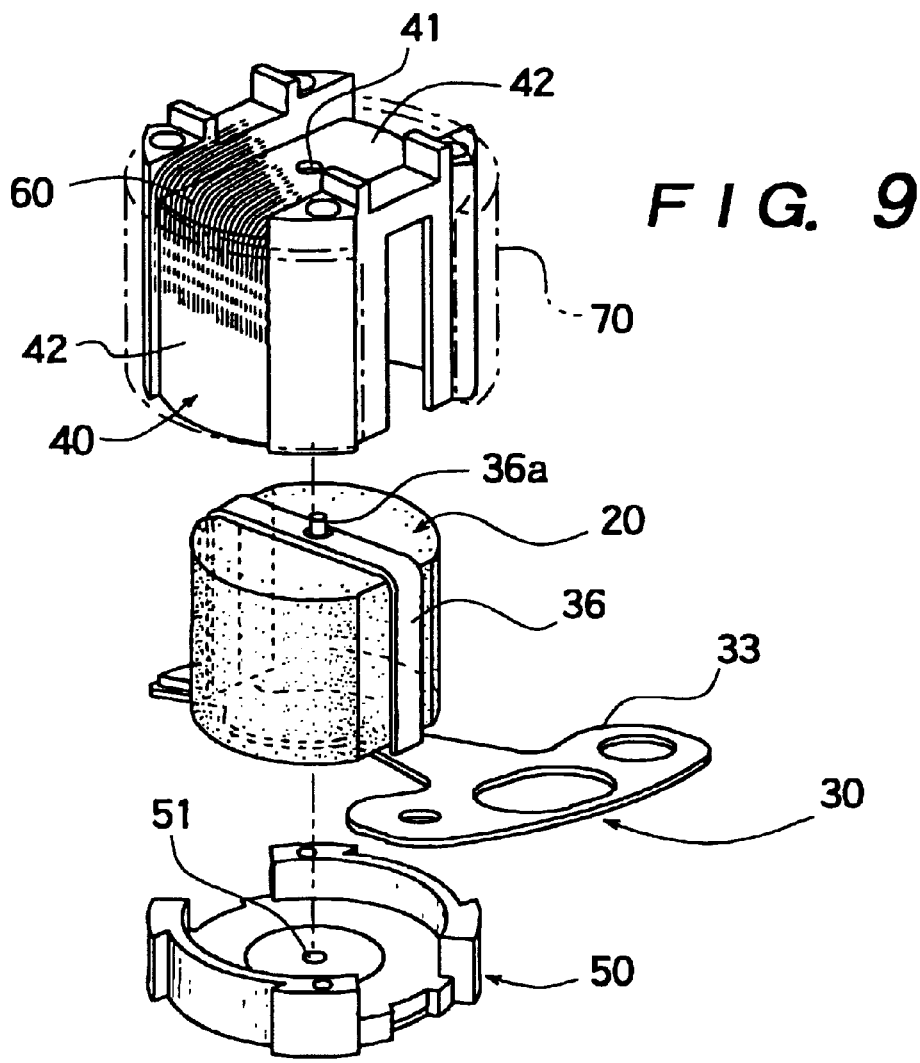
FIG. 9 is an exploded perspective view illustrating a second embodiment of this invention.
Figure 10:
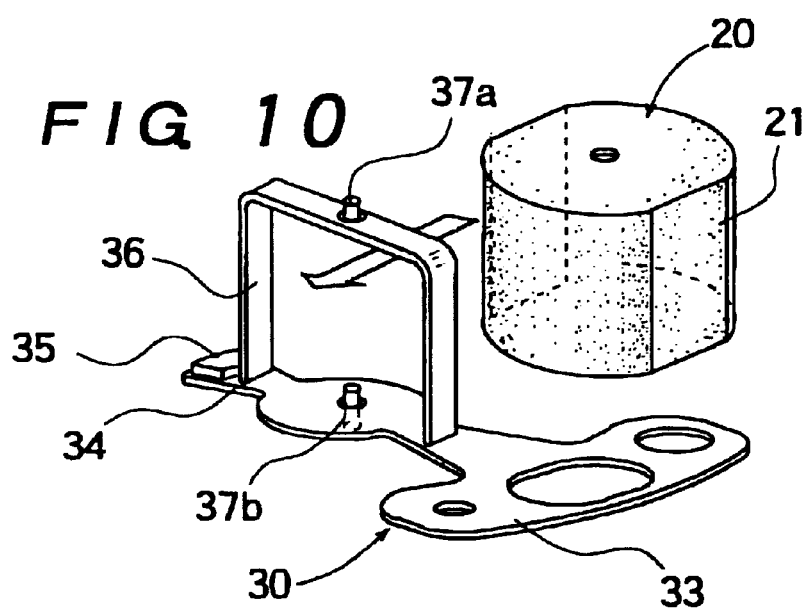
FIG. 10 is an exploded perspective view of a rotor and an aperture member in the device of FIG. 9.

FIG. 9 and FIG. 10 show the second embodiment employing a boreless rotor 20 having a stronger magnetic force.

The boreless rotor 20 is held by the aperture member 30 having a supporting bracket 36. The supporting bracket 36 has rotating projections 37*a* and 37*b* to be rotatably fitted into the bearing holes 41 and 51 formed in the holders 40 and 50.

The rotor 20 has flat cut portions 21 in the circumferential surface thereof so as to be secured immovably by the supporting bracket 36.

The aforesaid embodiment using the boreless rotor serves to not merely increase the magnetomotive performance of the device, but also make the structure including the rotor 20 and the aperture member 30 simple relatively.

Figure 11:
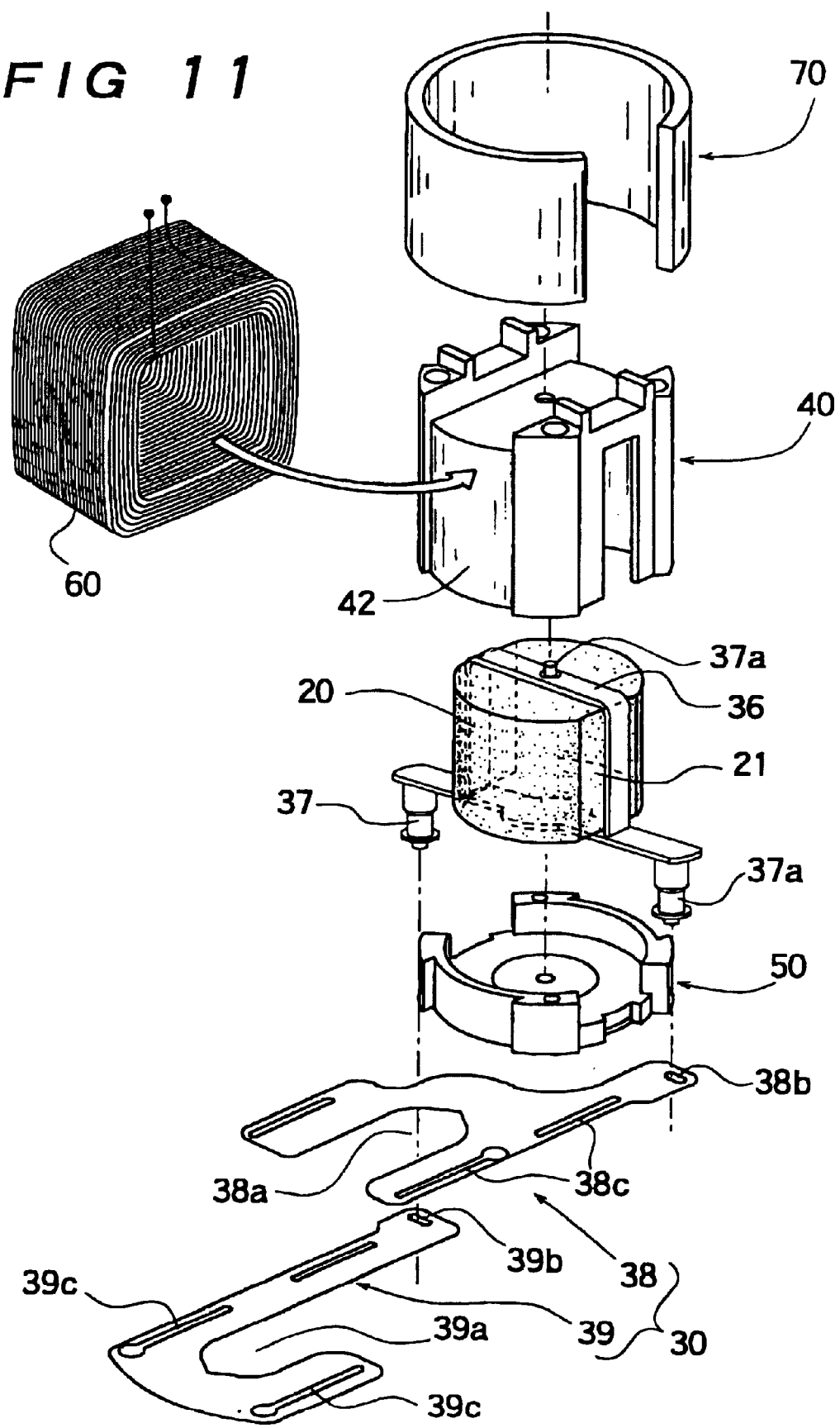
FIG. 11 is an exploded perspective view illustrating a third embodiment of this invention.
Figure 12:
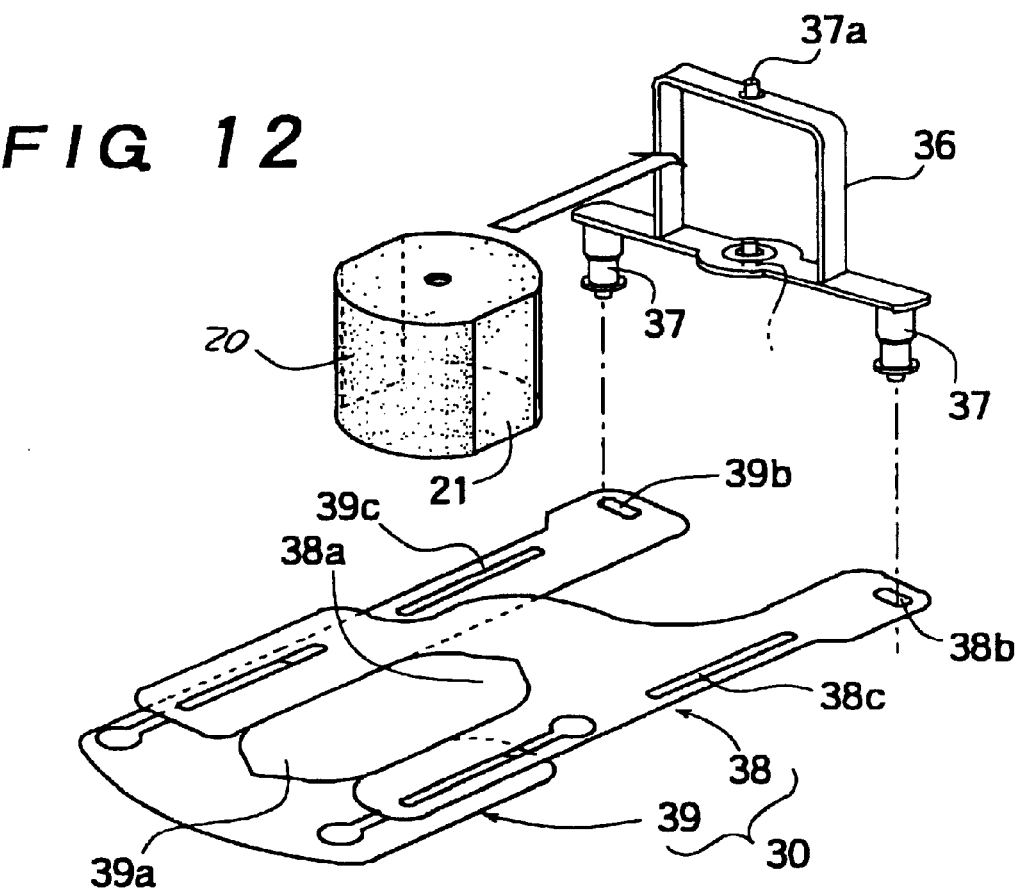
FIG. 12 is an exploded perspective view of a rotor and an aperture member in the device of FIG. 11.

FIG. 11 and FIG. 12 show the third embodiment in which the aperture member 30 is formed by a pair of aperture diaphragms 38 and 39. The diaphragms 38 and 39 have apertures 38*a* and 39*a*, drive holes 38*b* and 39*b*, and guide slots 38*c* and 39*c*, respectively.

Also in this embodiment, the rotor 20 has no axial hole appeared in the aforementioned first embodiment, similarly to the second embodiment shown in FIGS. 9 and 10. The supporting bracket 36 in this embodiment is provided with crank-like operating fingers 37 to be slidably inserted into the drive slots 38*b* and 39*b* of the aperture diaphragms 38 and 39.

By rotating the rotor 20 assembled with the supporting bracket 36, the operating fingers 37 inserted into the drive slots 38*b* and 39*b* of the diaphragms 38 and 39 are rockingly moved to slide the diaphragms 38 and 39 in opposite directions. Consequently, the iris aperture formed between the diaphragms 38 and 39 may continuously vary in size. However, three iris apertures different in size can be steadily formed by means of the rotor 20 which takes three exposing positions P0, P1 and P2 as specified above.

Figure 13:
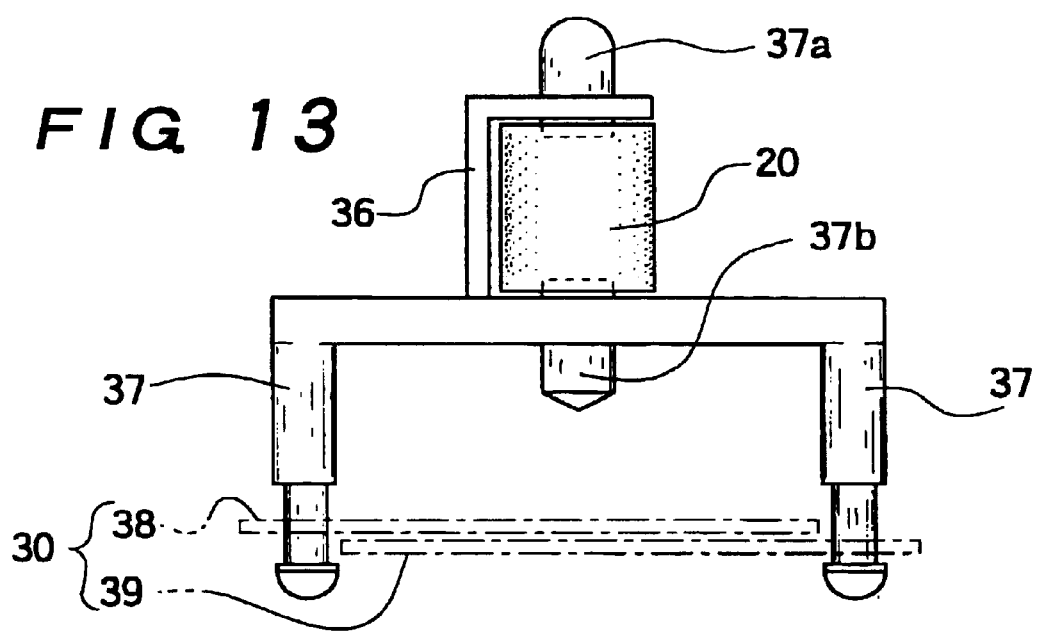
FIG. 13 is a side view schematically showing a holder for supporting a rotor in a fourth embodiment of this invention.

In the embodiments shown in FIGS. 9 through 12, the bracket 36 formed in a substantially square shape is used for supporting the rotor 20, but it may be shaped like a crank as shown in FIG. 13. In the embodiment illustrated in FIG. 13, like component members are denoted by the like reference numerals.

Figure 14:
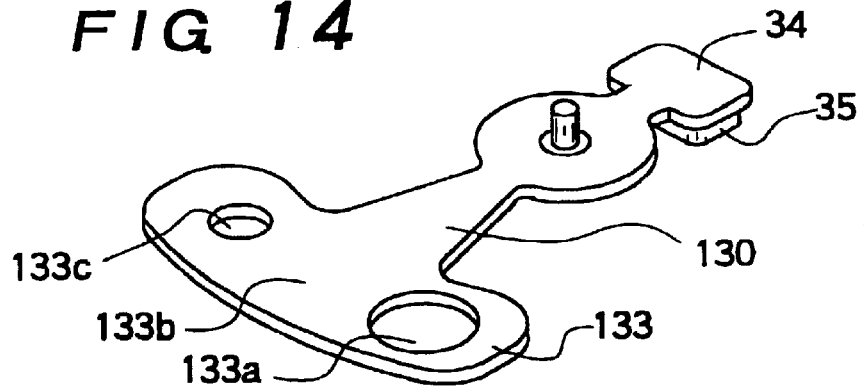
FIG. 14 is a perspective view showing an aperture member in a fifth embodiment of the invention.

FIG. 14 shows the fifth embodiment employing a modified aperture member 130 having a full aperture 133*a* formed in one side part of the aperture portion 133, and a reduced aperture 133*b* smaller than the full aperture 133*a*, which is formed in the other side part of the aperture portion 133. The aperture member 130 has no aperture in the middle part 133*b*, so that the middle part 133*b* can be used as a shutter for a camera in the steady state in which no current is applied to the coil.

In this embodiment, one of the apertures 133*a* and 133*c* may be made equal to the lens aperture of the camera as a full aperture.

Figure 15:
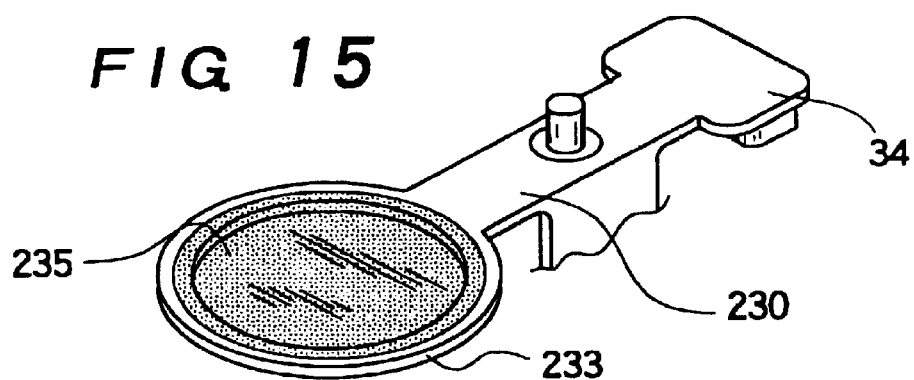
FIG. 15 is a perspective view showing an aperture member in a sixth embodiment of the invention.

FIG. 15 shows the sixth embodiment employing another modified aperture member 230 having only one aperture in an aperture portion 233, which is covered with a filter 235. The filter 235 used in this aperture member 230 may be a dimming filter, color filter, infra-red filter or the like.

Figure 16:
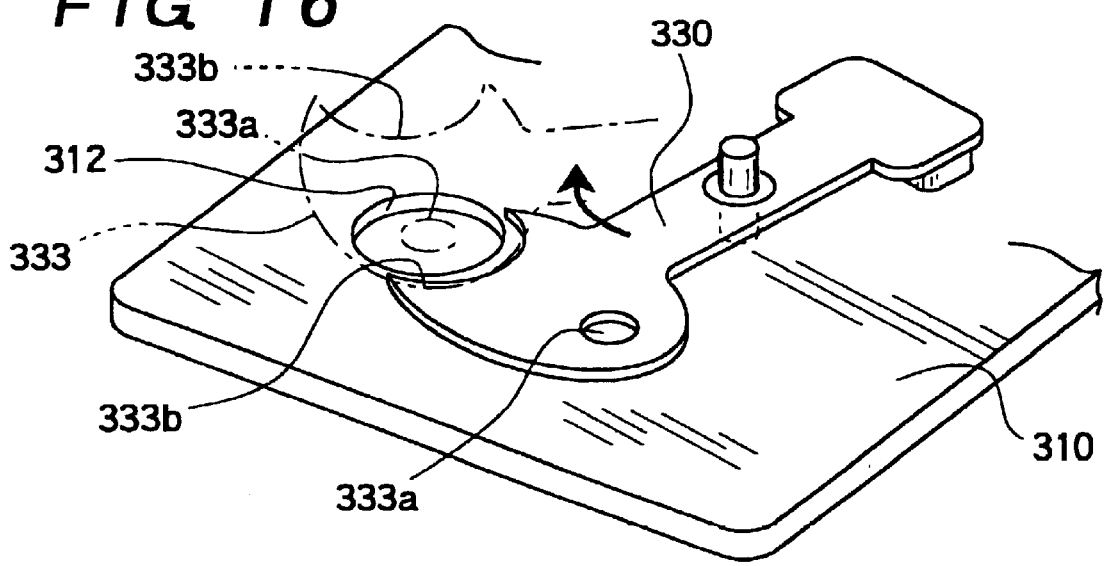
FIG. 16 is a perspective view showing an aperture member in a seventh embodiment of the invention.

FIG. 16 shows the seventh embodiment comprises an aperture base 310 having a stationary aperture 312, and a rotatable aperture portion 330 having a reduced aperture 333*a* and a notch aperture 333*b*.

According to this embodiment, it is possible to form a full aperture when the notch aperture 333*b* coincides with the stationary aperture 312 ad indicated by the solid lie in FIG. 16, and a reduced aperture when the reduced aperture 333*a* coincides with the stationary aperture 312 as indicated by the imaginary line.

As is apparent from the foregoing description, according to the exposure adjusting device of this invention, three exposing apertures can be effectively formed, as the aperture member steadily takes its magnetically neutral position by the magnetomotive force induced on the yoke by the magnetic field of the magnet rotor in the steady state in which no current is applied to the coil, and securely moves to the first or second aperture position according to the polarity of the direct current applied to the coil. The rotor can be stabilized in the magnetically neutral position by the magnetism which is induced in the yoke by the magnetic action of the rotor. Thus, the exposure adjusting device of the invention can steadily produce the desired three exposing states without using a mechanical elastic forcing means such as a spring, and therefore, it can be manufactured at a low cost and operated stably.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An exposure adjusting device for a camera, said device comprising:
   a rotor formed of a permanent magnet;
   an aperture member united with said rotor and having exposing apertures of different sizes;
   a coil surrounding said rotor united with said aperture member to generate a magnetic field with a direct current for magnetically rotating said rotor; and
   a yoke surrounding said coil and rotor.

2. The device according to claim 1, wherein said exposing apertures formed in said aperture member include a full aperture, a first reduced aperture smaller than said full aperture, and a second reduced aperture smaller than said first reduced aperture.

3. The device according to claim 1, wherein said exposing apertures formed in said aperture member include a full aperture and reduced aperture smaller than said full aperture.

4. The device according to claim 1, wherein said aperture member has one exposing aperture covered with a filter.

5. The device according to claim 1, wherein said aperture member includes an aperture base having a stationary aperture, and a rotatable aperture portion having a notch aperture and a reduced aperture.

6. The device according to claim 1, wherein said aperture member is formed of a pair of aperture diaphragms for forming an aperture, said aperture diaphragms being slidably movable to continuously vary said aperture in size.

7. The device according to claim 1, further comprising main and counterpart holders for accommodating said rotor.

8. The device according to claim 1, wherein said rotor is provided with an axial hole, and said aperture member is provided with a rotating shaft fitted into said axial hole of said rotor.

9. The device according to claim 1, wherein said aperture member is provided with a supporting bracket for being united with said rotor.

10. An exposure adjusting device for a camera, which comprises:
    a rotor formed of a permanent magnet having magnetic poles placed on a line extending in a magnetic direction connecting said magnetic poles,
    an aperture member having at least one exposing aperture, said aperture member extending along a line perpendicular to said magnetic direction of said rotor,
    a pair of holders for rotatably accommodating said rotor,
    a coil surrounding said rotor to generate a magnetic field with a direct current for magnetically rotating said rotor, and
    a yoke surrounding said coil and rotor, said yoke formed in a substantially C shape having a longitudinal slit defining by terminal ends opposed to each other, said slit being located on said line perpendicular to said magnetic direction of said rotor.

11. The device according to claim 10, wherein said aperture member includes an aperture portion in which said at least one aperture is formed, and a balancing portion, said aperture portion and said balancing portion being arranged along said line perpendicular to said magnetic direction of said rotor.

12. The device according to claim 10, wherein said rotor is provided with an axial hole, and said aperture member is provided with a rotating shaft fitted into said axial hole of said rotor.

13. The device according to claim 10, wherein said aperture member is provided with a supporting bracket for being united with said rotor.

14. The device according to claim 10, wherein said magnetic direction of said rotor coincides with a direction in which said coil is wound in a steady state of applying no current to said coil.

15. An exposure adjusting device for a camera, said device comprising:
    a rotor formed of a permanent magnet;
    an aperture member having at least one exposing aperture;
    a coil wound in one direction and surrounding said rotor connected with said aperture member to generate a magnetic field with a direct current for magnetically rotating said rotor; and
    a supporting bracket for holding said rotor in a direction crossing the direction in which said coil is wound and connecting said aperture member with said rotor.

* * * * *